Patented Sept. 19, 1939

2,173,444

UNITED STATES PATENT OFFICE 2,173,444

CELLULOSE ETHER PIGMENTED BASE

Robert Louis Zapp, Easton, Pa., assignor to Binney and Smith Company, New York, N. Y., a corporation of New Jersey No Drawing. Application August 2, 1937,
Serial No. 157,069

3 Claims. (Cl. 134—79)

My invention relates to the preparation of pigmented bases for use in the manufacture of coating compositions such as paints, varnishes, lacquers, enamels, inks, plastics and the like. More particularly the invention has for an object the preparation of a more thorough and permanent dispersion of a pigment within a dispersion medium composed in whole or in part of a cellulose ether.

The problem of satisfactorily pigmenting various organic vehicles for use in plastics and paints has been the subject of considerable study in the past. The dispersion of pigments within such common vehicles as linseed oil, resins and nitrocellulose has received major consideration and various methods have been proposed for dispersing pigments in such vehicles. While various materials have been suggested for facilitating the dispersion of a pigment in a vehicle during its processing, however, in the majority of cases these materials are specific to a particular type of vehicle and as a rule do not operate successfully, if at all, with vehicles of other types.

Comparatively little study has been given either to the determination of dispersing agents most suitable for the pigmentation of cellulose ethers or to the manner of mechanically incorporating the pigments in such mediums. For this reason coating and plastic compositions prepared from the cellulose ethers have not proved as satisfactory as those obtainable with the various other organic vehicles.

I have discovered that stable pigmented cellulose ether compositions having a high lustre and an exceptional depth of color may be prepared by carrying out the mechanical steps of incorporating the pigment in the cellulose ether in the presence of a salt of a metal of the nickel, iron and cobalt group, said salt being soluble in the cellulose ether pigmenting media. The metal salts best suited for this purpose, I have found, are those of the long chain fatty-acids.

In the preferred mode of manufacture of cellulose ether pigmented bases in accordance with the principles of my invention, I may advantageously employ the two-step process of dispersion disclosed in the patent of William B. Wiegand, No. 2,045,006, dated June 23, 1936. In following the practice of this two-step process the dispersion medium, cellulose ether or a mixture composed in major part of cellulose ether, is coalesced with a plasticizing agent, a pigment—for example, carbon black—and a nickel, iron or cobalt salt which is soluble in the coalesced mass. This coalescing or massing action is conducted under conditions most favorable to ready mixing, and either with or without the application of high shearing stresses, the amount of plasticizer present being such as to simply coalesce the cellulose ether without rendering it softly plastic. In the second step of the process, the mass resulting from the initial treatment is subjected to unusually high shearing stresses—such as are attained by passing it between closely set pressure rolls of the type commonly used in the rubber industry—while in a state of unusually stiff consistency.

The metal salt, which must be soluble in the pigmenting medium, may be incorporated at any point prior to or during the colloidal dispersing of the pigment in the medium. The preferred proportion of metal salts is between one and twenty per cent based on the weight of pigment. The specific volumes of the color pigments are somewhat lower than that of carbon black and the proportion of metal salt dispersing agent used with the color pigment will usually be somewhat smaller. While I have found that a soluble nickel salt when incorporated in the plastic cellulose ether mass serving as the dispersing medium for the pigment produces excellent results by actively promoting the dispersion of the pigment and by increasing the stability of the resulting pigmented base, nevertheless satisfactory results may also be achieved by employing the soluble salts of cobalt or iron, or by using a mixture of any of the above-mentioned metal salts. Although the soluble salts of nickel, iron and cobalt generally exert a specific and very beneficial influence upon the dispersion of a pigment in cellulose ether bases, the improvement in the character of coating compositions manufactured from such bases is most strikingly apparent when metal salts (or soaps) of the long chain fatty acids, and particularly of oleic acid, are employed. The nickel salts have been found to give better results than the corresponding iron and cobalt salts. The nickel, iron and cobalt salts of palmitic and naphthenic acids have proven satisfactory, as have also the metal salts of aromatic acids, such as the salicylates, although the latter salts are not as effective as those of the long chain fatty-acids.

The following examples of the manufacture of cellulose ether pigmented bases involving the use of carbon black and chrome green as the pigments will serve to make the invention more clear. It is to be emphasized that in these examples the cellulose ether is in all cases the dispersion medium.

A charge of the following materials in the proportions stated may be regarded as typical:

Example I

| | Parts by weight |
|---|---|
| Ethyl cellulose "B" low viscosity (18 centipoises) | 100 |
| Carbon black | 50 |
| Linseed oil fatty acids | 10 |
| Nickel oleate | 5 |
| Xylene | 39 |

The carbon black is first wet down with the xylene and then massed with the other ingredients in a mixing machine of the dough mixer type by which the ingredients are thoroughly admixed by the action of agitating blades revolving within the plastic mass. The massing operation may be continued by repeatedly passing batches of the materials after treatment in the dough mixer between relatively widely separated pressure rolls, such as are employed in the rubber industry, while the dispersion medium, ethyl cellulose, is in a plastic state. This operation is continued until, due to the evaporation of a part of the incorporated volatile solvent, the mass has attained that degree of consistency—which may be termed stiffly-plastic or leather-like—best adapted for the application thereto of high shearing stresses.

In the second step, the stiffly plastic ethyl cellulose base having the pigment and the nickel oleate dispersing agent admixed therewith is passed between the same or a second pair of pressure rolls set tight so that the plastic mass issues from the rolls as a sheet having a thickness of about $\frac{1}{8}$ to $\frac{1}{32}$ inch. The rolls, which are driven at different speeds so as to subject the mass to exceptionally high shearing stresses, may be heated or cooled if necessary to maintain the proper temperature and consistency of the mass. The thin sheet of material issuing from the rolls may be passed again and again between the rolls until a thorough, uniform and permanent colloidal dispersion of the pigment in the ethyl cellulose is assured.

The fairly dry pigmented sheets after cooling to normal room temperature will be sufficiently brittle to permit the same to be broken into chips or flaky fragments of paper-like thinness, in which condition they may be packaged for shipment or sold in bulk directly to the trade. Alternatively the chips may be dissolved in a suitable solvent to form a solution or paste.

When such pigmented base is dissolved in a solvent, either with or without additional ingredients, a paint, varnish, enamel or lacquer characterized by its high lustre, depth of tone, stability and permanency is obtained. An advantage of the cellulose ether pigmented base produced in accordance with this invention is that it is compatible with many other paint, lacquer, and enamel vehicles and can be used as a general pigmenting medium.

In the formula given in Example I, dibutyl phthalate may be substituted for the linseed oil fatty-acids in substantially the same proportion without appreciably affecting the characteristics of the product. Other common solvent plasticizers such as tricresyl phosphate and the phthalic acid esters may be incorporated with, or substituted for, the dibutyl phthalate or linseed oil fatty-acids so long as such agents are compatible with the ethyl cellulose.

Other solvents and swelling agents for the cellulose ether may be used in place of, or in combination with, the xylene mentioned in the above example. Toluene and "Solvesso", a hydrogenated petroleum hydrocarbon derivative, are both suitable for this purpose. The solvents and plasticizers should preferably be chosen so that they are solvents for the metal salt used as the dispersing agent.

The invention lends itself very well to the manufacture of bases containing pigments other than carbon black. The following example illustrates the use of chrome green as the pigment in a pigmented base otherwise corresponding essentially to the typical formula set forth above in Example I.

Example II

| | Parts by weight |
|---|---|
| Ethyl cellulose (18 centipoises) | 100 |
| Chrome green | 300 |
| Dibutyl phthalate | 10 |
| Nickel oleate | 5 |
| Xylene | 39 |

The ethyl cellulose in these two examples is of the low viscosity type, but any viscosity may be used. As has before been suggested, dibutyl phthalate and linseed oil fatty-acids may be regarded as mutually substitutable in the above formulas, and also any other suitable plasticizer that is compatible with ethyl cellulose may be added in appropriate amounts to the ingredients.

Other pigments which may be successfully employed in the above Example II in place of chrome green, together with their parts by weight (indicated in parentheses) are: Titanium dioxide (250), maroon lake (100), and Prussian blue (100). Various pigments or mixtures of pigments may be employed other than those noted above according to the desired color and tone of the coating composition.

The pigmentation of cellulose ethers other than ethyl cellulose is similarly benefitted by the use of nickel, iron and cobalt salts of organic acids, which salts are soluble in the dispersing media. The following formula is suitable for the pigmentation of benzyl cellulose:

Example III

| | Parts by weight |
|---|---|
| Benzyl cellulose (low viscosity) | 140 |
| Carbon black | 70 |
| Nickel oleate | 7 |
| Dibutyl phthalate | 14 |
| Xylene | 60 |

The pigmented bases referred to in Examples I, II, and III above may be mixed with suitable volatile solvents for the cellulose ether dispersion medium to produce liquid coating compositions of the character of paints, varnishes, lacquers, enamels and the like. Ordinarily, the cellulose ether pigmented base will be combined with other vehicles, such as oils, natural and synthetic resins and cellulose derivatives, with which the cellulose ether is compatible, or with mixtures of such vehicles. In the manufacture of pigmented coating preparations, the pigmented ethyl cellulose chip is preferably dissolved in an equal amount, by weight, of a thinner such as a mixture of 80 percent xylene and 20 percent of a high or medium "boiling" acetate or alcohol (for example, butyl acetate, amyl acetate, or butanol) and this solution will be added to the clear varnish vehicles to be pigmented.

As examples of several types of coating compositions produced from the pigmented bases described above, the following formulas are given:

NITROCELLULOSE

Example IV (a)

| | Parts by weight |
|---|---|
| Nitrocellulose (½ sec. Hercules) | 50.0 |
| Glycerol-phthalate resin modified with 28% non-drying fatty acids | 25.0 |
| Tricresyl phosphate | 25.0 |
| Lacquer thinner | 900.0 |

(b)

| | |
|---|---:|
| Ethyl cellulose pigmented chip (Example I) | 16.6 |
| Lacquer thinner | 149.4 |

The nitrocellulose, alkyd resin and plasticizer are first dissolved in the lacquer thinner to form a ten percent solution (a). The ethyl cellulose pigmented chip is also cut with the lacquer thinner to form a solution (b) and the two solutions (a) and (b) are then intimately mixed to yield a glossy, black lacquer. The alkyd resin in the above formula is sold under the trade name "Rezyl 12". The composition of the lacquer thinner in this example is:

Example V

| | Per cent |
|---|---:|
| Toluene | 50 |
| Butanol | 10 |
| Ethyl acetate | 15 |
| Butyl acetate | 25 |
| | 100 |

Any of the cellulose ether pigmented bases may be substituted for or used along with the ethyl cellulose pigmented chip in the above formula.

ALKYD RESIN

Example VI (a)

| | Parts by weight |
|---|---:|
| Phenol and oil modified alkyd resin (solid) | 100.0 |
| Xylene | 100.0 |

(b)

| | |
|---|---:|
| Ethyl cellulose pigmented chip (Example II) | 16.0 |
| Xylene | 115.0 |
| Butanol | 29.0 |

(c)

| | |
|---|---:|
| Drier solution | 4.2 |

The alkyd resin is first cut in equal parts of xylene (a) and the ethyl cellulose pigmented chip is dissolved in the xylene-butanol mixture (b). The three solutions (a), (b) and (c) of resin, pigmented cellulose ether chip and drier, are then uniformly mixed to form a green alkyd resin enamel. The phenol and oil modified alkyd resin in the above example is sold under the trade name "Beckosol #1". Other synthetic resins can be substituted for the alkyd resin, such as "Beckosol #18", a long-oil alkyd resin having an acid number of 15.

VARNISH COMPOSITIONS

Example VII (a)

| | Parts by weight |
|---|---:|
| Pure phenolic resin | 100.0 |
| China-wood oil | 88.0 |
| Xylene | 217.0 |
| Linseed oil fatty acids | 29.0 |

(b)

| | |
|---|---:|
| Ethyl cellulose pigmented chip | 35.0 |
| Xylene | 252.0 |
| Butyl acetate | 63.0 |

(c)

| | |
|---|---:|
| Drier solution | 2.6 |

The phenol-aldehyde resin and China-wood oil are first made into a varnish. This varnish is cut with the xylene and the linseed oil fatty acids dissolved therein. The thinned varnish (a), the cellulose-ether pigmented chip dissolved in the xylene-butyl acetate mixture (b) and the drier solution (c) are then intimately mixed to form a pigmented varnish composition. The phenolic resin used above is sold under the trade name "Super-Beckacite #2000".

The proportion of drier solution in these formulae can be varied over a broad range depending on whether a low bake, high bake or air dry finish is desired. The composition of the drier in the above examples is as follows:

Example VIII

| | Parts by weight |
|---|---:|
| Lead naphthenate in mineral spirits (34% metal) | 40.0 |
| Cobalt naphthenate in mineral spirits (6% metal) | 5.6 |
| Manganese linoleate solution (8.2% metal) | 20.6 |
| Xylene | 33.8 |

The cellulose ether pigmented chip can be used for pigmenting other resin-oil varnish compositions such as "Vinsol" resin (polymerized and oxidized abietic acid and terpenes) incorporated with China-wood oil, ester-gum modified alkyd resin "Teglac X 152" incorporated with boiled linseed oil, "Bakelite", "BR 254" or "BR 820" (phenol formaldehyde resin) incorporated with a mixture of China-wood oil and boiled linseed oil, "Phenac 615 N" (ester gum modified phenol formaldehyde) incorporated with China-wood oil, and a mixture of "Bakelite 254" or "Teglac 15" incorporated with a mixture of China-wood oil and bodied linseed oil.

Although the invention is particularly directed to the pigmenting of ethyl cellulose in the presence of nickel, iron and cobalt salts, it is within the contemplation of this invention to similarly pigment any of the other common cellulose ethers, such as methyl cellulose, butyl cellulose, benzyl cellulose, and glycol cellulose which, while not as effective as ethyl cellulose, nevertheless exhibit, when manufactured into coating compositions, improved qualities such as higher gloss, greater depth of color, increased stability and general compatibility.

It will be understood that while I have described a preferred mode of dispersing the pigment within the cellulose ether corresponding in all fundamental respects to the two-step process disclosed in the previously referred to patent of Wiegand, the invention is not limited to that particular mode of manipulation but in its broader aspect comprehends other methods of mechanically effecting the dispersion of a pigment within a dispersion medium.

I claim:

1. A carbon black pigmented cellulose ether base comprising a ground intermixture of carbon black with a plasticized cellulose ether and a nickel soap dispersing agent soluble in the cellulose ether mass.

2. A carbon black pigmented ethyl cellulose base comprising carbon black uniformly massed and mechanically worked with ethyl cellulose, a plasticizer, and about 10 per cent of nickel oleate based on the weight of the carbon black, serving as a dispersing agent.

3. A carbon black pigmented ethyl cellulose base comprising carbon black uniformly massed and mechanically worked with ethyl cellulose, a plasticizer and nickel oleate serving as a dispersing agent.

ROBERT LOUIS ZAPP.